United States Patent [19]
Kinstler

[11] Patent Number: 5,522,567
[45] Date of Patent: Jun. 4, 1996

[54] ENERGY MANAGEMENT SYSTEM FOR A GLIDING VEHICLE

[75] Inventor: Gary A. Kinstler, Torrance, Calif.

[73] Assignee: Rockwell International Corp., Seal Beach, Calif.

[21] Appl. No.: 365,383

[22] Filed: Dec. 28, 1994

[51] Int. Cl.$^6$ .................................................. F42B 15/01
[52] U.S. Cl. ........................................................ 244/3.15
[58] Field of Search ................................. 244/3.1, 3.15, 244/3.17, 3.21; 102/384

[56] References Cited

U.S. PATENT DOCUMENTS

| | | | |
|---|---|---|---|
| 2,541,277 | 2/1951 | Omberg et al. | 244/3.17 |
| 3,005,981 | 10/1961 | Sanders, Jr. et al. | 244/3.15 |
| 3,341,152 | 9/1967 | Kantrowitz et al. | 102/384 |
| 3,752,967 | 8/1973 | Vietor | 235/150.22 |
| 3,784,800 | 1/1974 | Willoteaux | 244/3.15 |
| 3,990,657 | 11/1976 | Schott | 244/3.15 |
| 4,164,340 | 8/1979 | Simpson | 244/186 |
| 4,456,202 | 6/1984 | Price, Jr. et al. | 244/3.15 |
| 4,502,649 | 3/1985 | Botwin et al. | 244/3.1 |
| 4,541,591 | 9/1985 | Chadwick et al. | 244/3.15 |
| 4,662,580 | 5/1987 | Nelson | 244/3.21 |
| 4,825,374 | 4/1989 | King et al. | 244/186 |
| 4,883,289 | 11/1989 | Lachmann et al. | 244/3.15 |
| 4,993,662 | 2/1991 | Barnes et al. | 244/3.17 |
| 5,071,087 | 12/1991 | Gray | 244/3.15 |
| 5,361,212 | 11/1994 | Class et al. | 244/114 R |

*Primary Examiner*—Michael J. Carone
*Assistant Examiner*—Theresa M. Wesson
*Attorney, Agent, or Firm*—Charles T. Silberberg; Lawrence N. Ginsberg; Terrell P. Lewis

[57] ABSTRACT

This invention is an apparatus and method for determining a set of instantaneous values of optimum flight path for a gliding vehicle at any time t, by determining, at each time t, altitude and position information associated with the vehicle, and wind profile information as a function of the altitude of the vehicle; determining, at each time t, the effective glide slope ratio of the vehicle as a function of the altitude of the vehicle, and then integrating the effective glide slope ratio, at each time t, from the destination point toward the current position and altitude of the vehicle. The invention also contemplates converting such time-dependent value of optimum flight path into a set of control commands for control surface actuators on the vehicle.

11 Claims, 12 Drawing Sheets

ENERGY MANAGEMENT SYSTEM FOR A GLIDING VEHICLE

BACKGROUND OF THE INVENTION

1. Field of the Invention

The present invention relates to apparatus employed to provide energy management, navigation and guidance to an unpowered gliding vehicle.

2. Description of the Related Art

Recent world events have highlighted a need for systems that safely and accurately deliver cargo payloads from airborne craft to ground-based regions, especially for the purpose of meeting humanitarian or military objectives.

For example, in Bosnia, recent ground movement of medical and food relief supplies was routinely blocked by feuding forces. Airlifted supplies dropped by parachute over designated targets missed their mark nearly 90% of the time due to the need to make those drops at altitudes safely above ground fire, as well as the ability of the aircraft to arrive and release the cargo at precisely the correct drop coordinate and the uncertainties in wind drift as the parachuted cargo descended to the ground.

Similar conditions were experienced in Somalia as relief supplies were blocked by feuding warlords from reaching those people who desperately needed them.

In the past, the most commonly used devices for air dropping cargo to predetermined destinations have been guided parachutes. Such apparatus offers limited safety capability because they tend to overfly the destination landing zone as a result of their predominantly vertical drop profile.

Clearly there exists a need for an airborne cargo delivery system, including an energy management and navigation system which could be installed in the cargo delivery vehicle, which would enable cargo to be airdropped at safe distances from troubled areas and precisely reach a predetermined, desired landing area.

OBJECTS AND SUMMARY OF THE INVENTION

It is, therefore, a principal object of the present invention to provide a novel energy management and navigation system which will overcome all the disadvantages and shortcomings of known apparatus of the same kind.

Another object of the present invention is to provide an energy management and navigation system for optimizing a glide vehicle's flight path from the launch point to the destination.

Another object of the present invention is to provide an energy management and navigation system for a glide vehicle which will enable the vehicle to traverse the distance between the launch point and the destination point in as short a time as possible, regardless of various flight impediments such as headwinds, cross-winds, thermals, icing conditions, etc.

Another object of the present invention is to provide an accurate guidance and control system for an unpowered, high efficiency glide vehicle so that the vehicle can be guided from a point of high altitude discharge to a remote, ground-based location.

These and other objects are achieved by the navigation and energy management apparatus of the present invention, which is embodied in a gliding aircraft. The apparatus is based on the known glide slope capabilities of a given gliding vehicle, and the extreme accuracy of GPS-based navigational aids. The apparatus of the invention is capable of guiding the gliding vehicle to a precise landing destination in the presence of widely varying and uncertain headwinds or tailwinds enroute to the landing site. The invention provides a low-cost means for accurately delivering payloads to troubled destinations without exposing the delivering personnel to hostile environments.

DETAILED DESCRIPTION OF THE PREFERRED EMBODIMENTS

Figure 1:
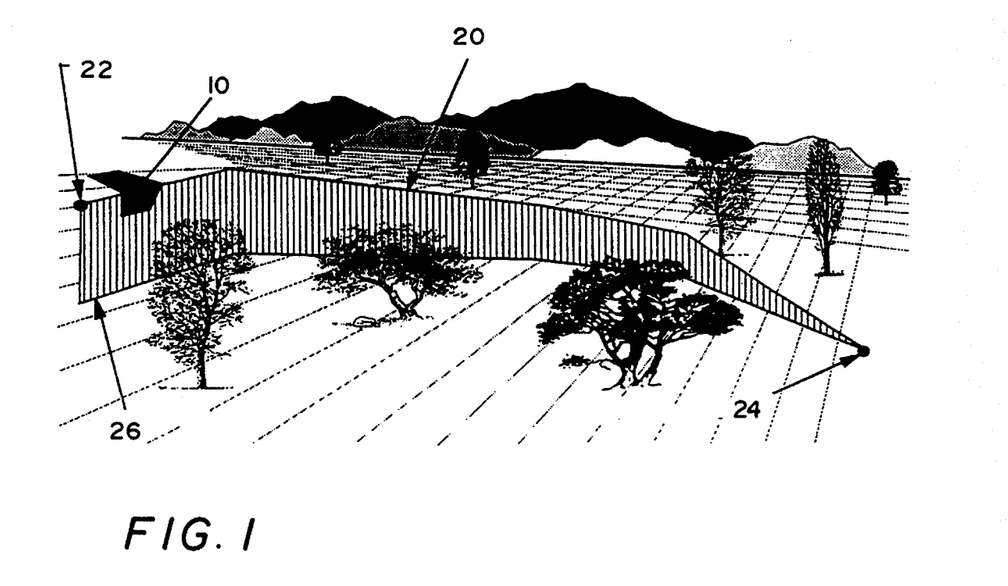
FIG. 1 is a diagram illustrating an exemplary operational scenario for a glide vehicle which is guided through a flight path using the Energy Management System of the present invention.

Referring now to the drawings and the characters of reference marked thereon, FIG. 1 illustrates an exemplary operational scenario for a glide vehicle 10 which is guided through a flight path using a navigation and energy management system according to the present invention. As shown, the vehicle follows a prescribed ground path which correlates to a glide slope path 20 between the vehicle launch point 22 and the intended landing zone 24. Initially, the ground path is chosen with the objective of taking advantage of unobstructed approach directions to the landing zone, or to avoid other hazards. As shown, the vehicle 10 would be launched from a mother ship (not shown) at the launch point 22.

To reach the desired landing destination, both lateral (left/right) and vertical guidance must be successfully accomplished. Lateral guidance is achieved using methods of enroute waypoint navigation coupled with a lateral steering autopilot which controls the lateral steering control surfaces of the glide vehicle.

The more critical task for an unpowered glide vehicle is the management of the available potential energy of the glide vehicle as it approaches the landing destination such that it always retains maximum margins of tolerance in response to changing wind conditions. The present invention utilizes the glide vehicle's defined envelope of glide slope ratio capability as explicit input to the energy management system's "control law".

Figure 2:
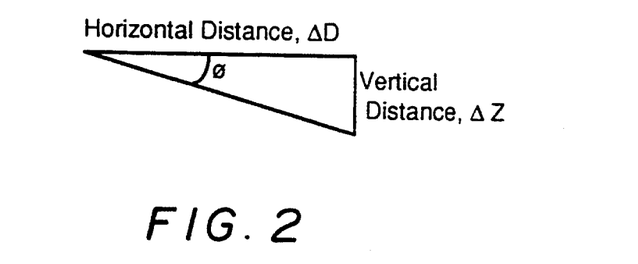
FIG. 2 is a diagram showing the components of glide slope ratio (GSR), and glide slope angle ($\phi$)

Glide Slope Ratio ("GSR") is a measure of the efficiency with which the air vehicle traverses an air space, and is defined as the horizontal distance traveled through a stationary air mass divided by the vertical altitude lost. The corresponding glide slope angle is the arctangent of these two distances. These relationships, depicted schematically in FIG. 2, are determined by the following equations:

Glide Slope Ratio (GSR)=$\Delta D/\Delta Z$

Glide Slope Angle ($\phi$)=$\tan^{-1}$ ($\Delta D/\Delta Z$)

The achievable GSR for a given vehicle will be a function of several variables, including the fixed design of the vehicle, the current weight being carried by the vehicle, air density, airspeed, and control surface settings. Airspeed and control surface settings are the only variables under the direction of a control law during any given flight. The GSR is generally maximized at a given flight condition, i.e., airspeed and control surface setting. When it is desired to minimize the GSR, i.e., to maximize the rate of descent for a given horizontal distance traveled, a different combination of control surface settings is used to achieve that effect.

Figure 2A:
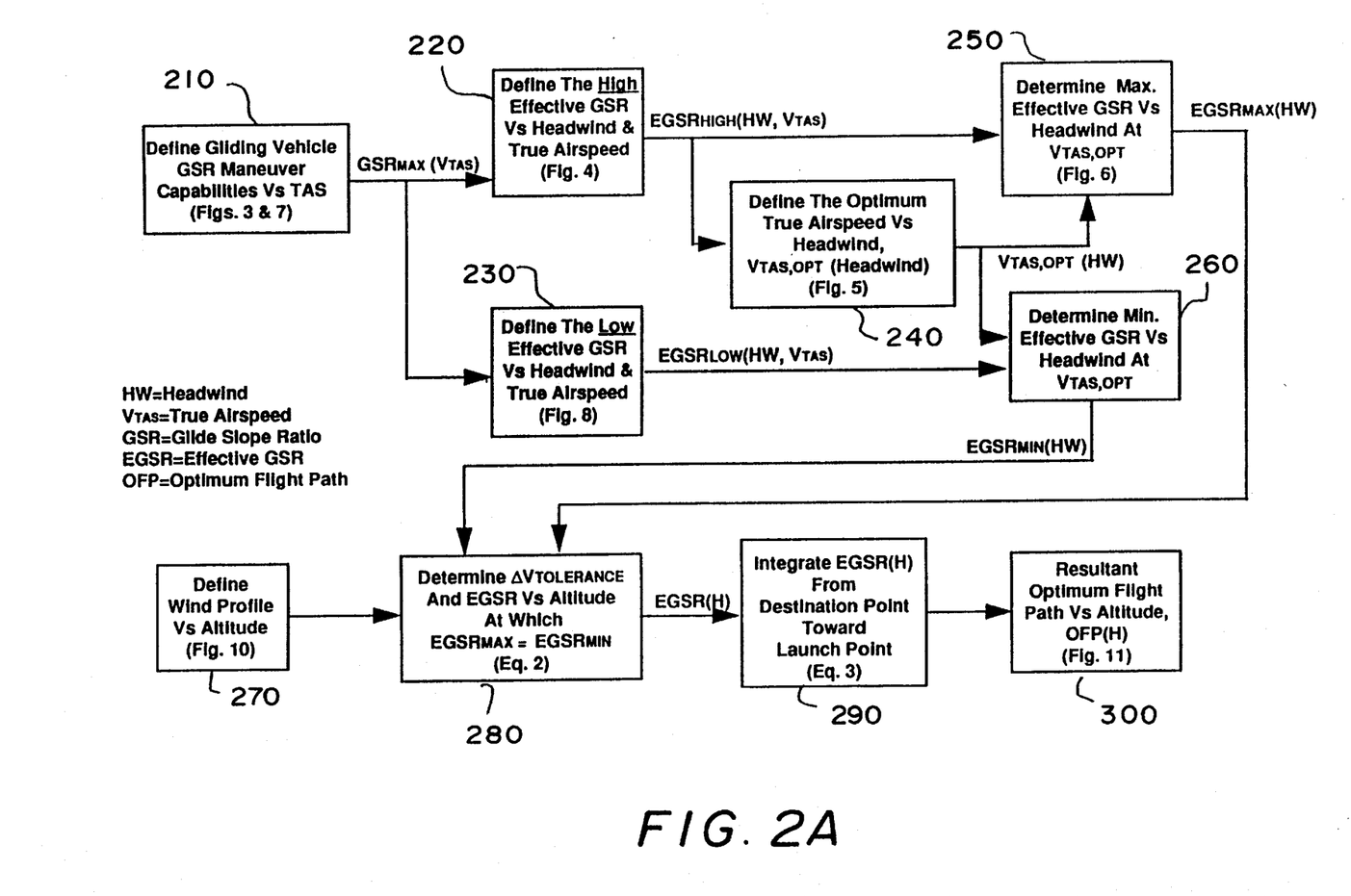
FIG. 2A is a diagram showing the logic flow chart for developing an optimum flight path "control law"

The methodology for the development of the control law is depicted in the flow chart of FIG. 2A, and begins with a definition of the GSR maneuver capabilities of the glide vehicle. The first step 210 involves a determination of the maximum GSR envelope. It occurs with a given control surface setting, and remains a function of airspeed. The next steps in the logic flow chart of FIG. 2A are depicted by blocks 220 and 230. In block 220, the high Effective Glide Slope Ratio (EGSR)" is determined as a function of headwind and true airspeed (see FIG. 4 and its corresponding description below). In block 230, the Low EGSR is determined as a function of headwind and true airspeed (see FIG. 8 and the corresponding description below). In block 240 of the logic flow chart of FIG. 2A, the output of block 220 is used to make the determination of an optimum true airspeed as a function of headwind. In block 250, the output of blocks 220 and 240 are used to obtain a determination of the maximum EGSR as a function of headwind at the optimum true airspeed. The outputs of blocks 240 and 230 are used in block 260 for a determination of minimum EGSR as a function of headwind at the optimum true air speed. The outputs of blocks 250 and 260 are used in block 280, along with the output of block 270 (wind profile as a function of altitude), for a determination of the velocity differential and single value of EGSR as a function of altitude where $EGSR_{MAX}=EGSR_{MIN}$. At block 290, the single value of EGSR from the determination made at block 280 is used as input for an integration operation, the result of which is a value which represents the optimum flight path as a function of altitude.

Figure 3:
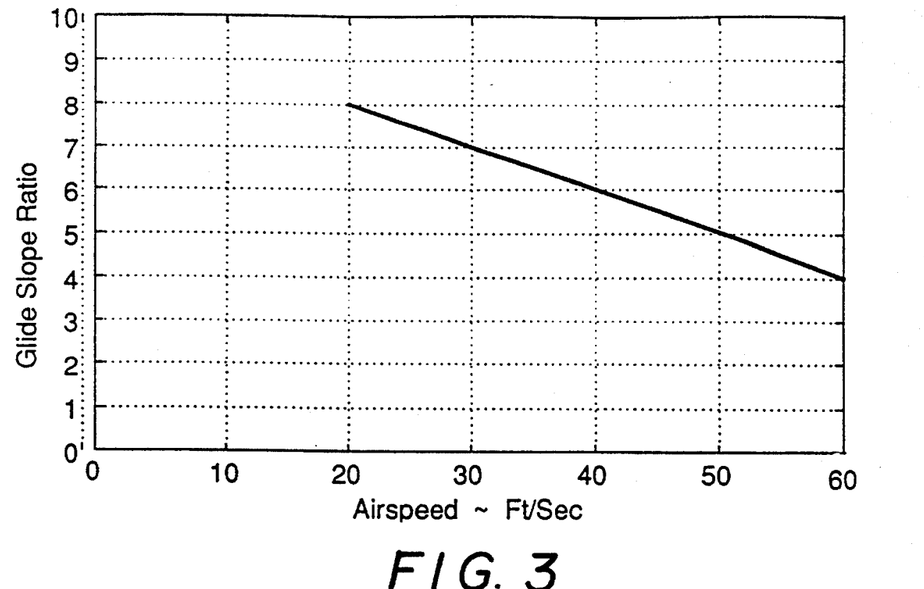
FIG. 3 is a graph showing the relationship between the maximum glide slope ratio and airspeed.

FIG. 3 depicts the relationship between the maximum GSR envelope and airspeed of the gliding vehicle for an exemplary gliding vehicle. The shape of the GSR vs. airspeed relationship is not critical to the functioning of the control law presented herein, and may exhibit a local maximum at a speed other than the lowest speed shown in this example.

This particular example, however, illustrates a valid GSR between airspeeds of 20 ft./sec. and 60 ft./sec., with the optimum still-air-GSR occurring at the minimum airspeed.

In order to maximize the distance over which a glide vehicle may fly, it is necessary to operate at the flight condition which results in the highest GSR. For example, in FIG. 3, this would occur at an airspeed of 20 ft/sec in a stationary air mass.

However, in a non-stationary air mass (i.e., in the presence of a headwind or tailwind), the GSR for measuring translational motion with respect to inertial space (i.e., the ground) is either enhanced or diminished, with the resultant GSR in inertial space being termed the Effective Glide Slope Ratio ("EGSR").

For example, in the presence of a tailwind of 20 ft/sec, a glide vehicle flying at an airspeed of 20 ft/sec would experience twice the ground speed as it would have in still air, thereby resulting in effectively twice its still-air GSR, or 16 in this case.

The Effective Glide Slope Ratio, EGSR, is determined by the following equation:

$$EGSR = \frac{V_{TAS}(\cos \theta) - V_{HEADWIND}}{V_{TAS}(\sin \theta)}, \quad (1)$$

where $V_{TAS}$=Glide Vehicle True Airspeed (ft/sec)

$V_{HEADWIND}$=Headwind Speed (ft/sec)

$\theta$=Still Air Mass Glide Slope Angle (degrees)

Figure 4:
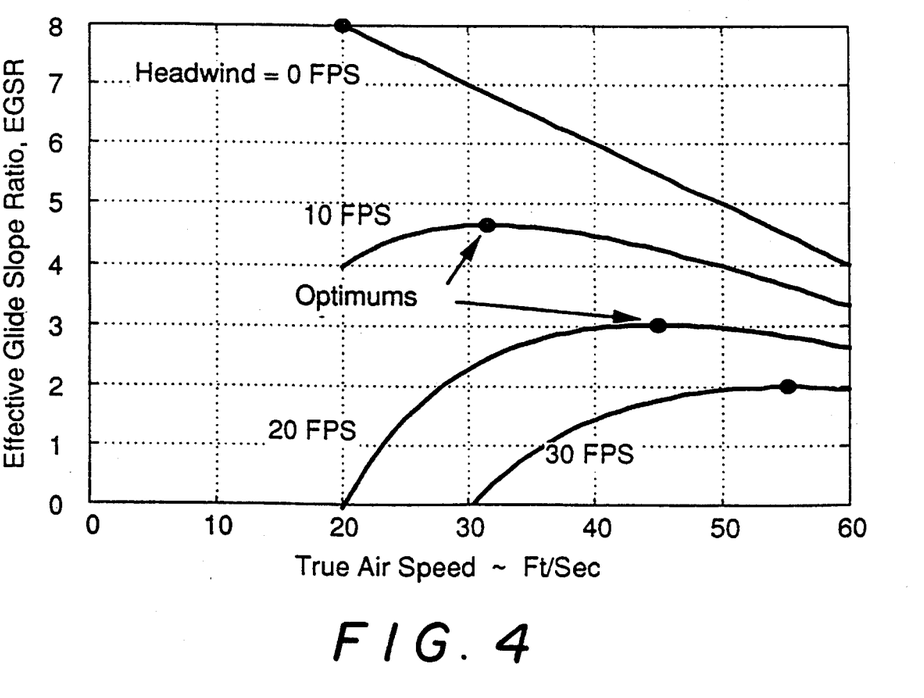
FIG. 4 is a graph showing the relationship between the effective glide slope ratio and true airspeed.

FIG. 4 shows the variance of the Effective Glide Slope Ratio (EGSR) with the True Air Speed of the vehicle for different headwind values. As shown, for each headwind value, there is one airspeed (depicted as an open circle on each line) that represents the maximum value of the EGSR. These optimum values may be easily identified by inspection of the graph, or they may be determined by numerical analysis techniques.

These data points have been plotted on graphs (in FIGS. 5 and 6) which correlate headwind speed and optimum airspeed, and the maximum achievable Effective Glide Slope Ratio at the optimum airspeed, respectively.

Figure 5:
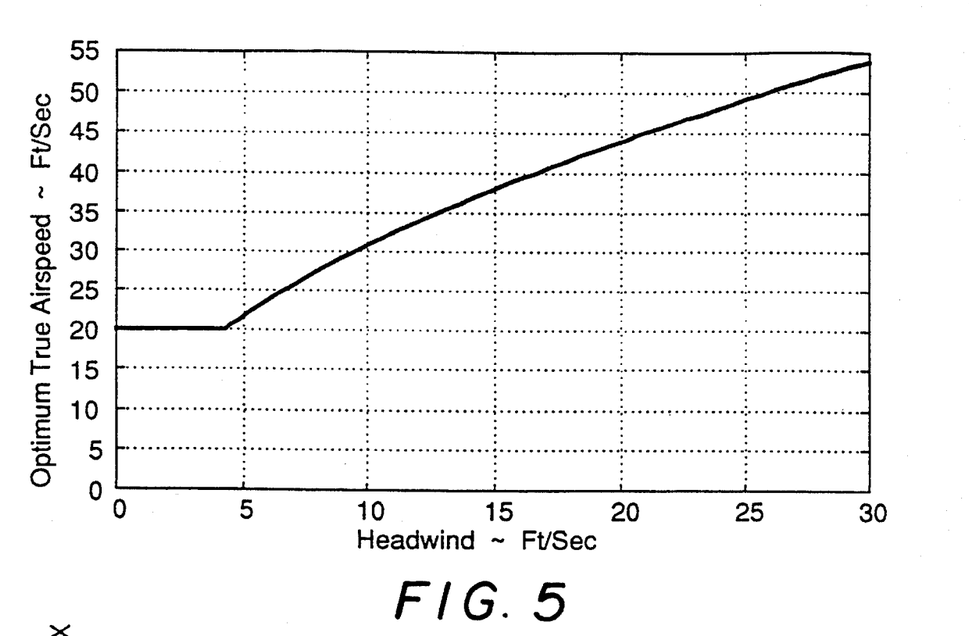
FIG. 5 is a graph showing the relationship between optimum airspeed (that which produces the maximum effective glide slope ratio) and headwinds.

FIG. 5 graphically shows the relationship for optimum true airspeed ($V_{TAX}$,OPT) as a function of headwind speed for a glide vehicle with the still-air Glide Slope Ratio characteristics of FIG. 3.

Figure 6:
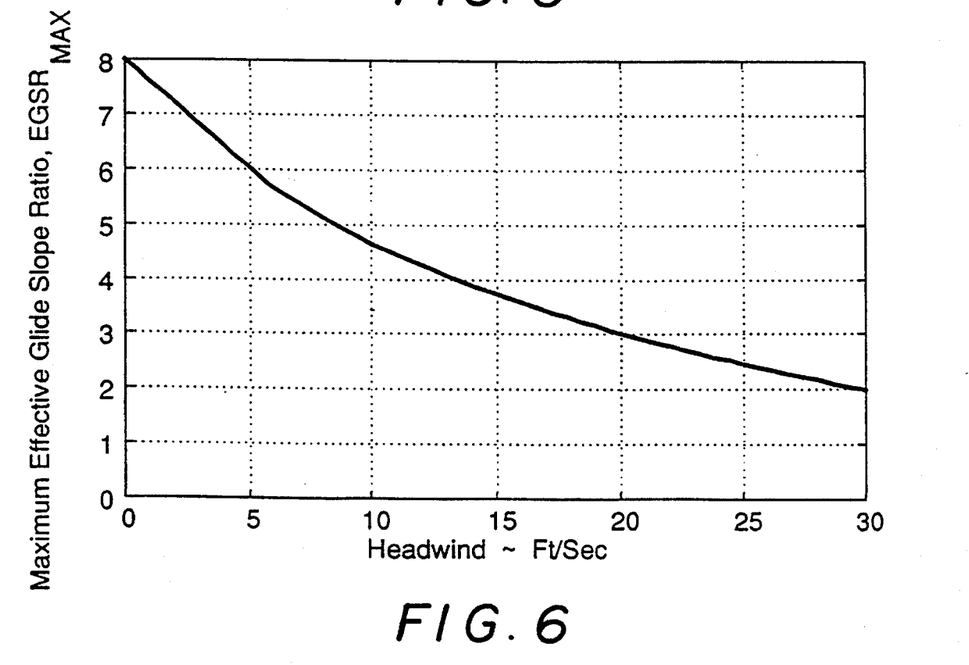
FIG. 6 is a graph showing the relationship between the value of the maximum effective glide slope ratio and headwinds.

Similarly, FIG. 6 depicts the maximum achievable Effective Glide Slope Ratio, $EGSR_{MAX}$, at the optimum speed for a given headwind magnitude. Though FIG. 6 shows the reduction of $EGSR_{MAX}$ in the presence of headwinds of positive magnitude, an increase in the $EGSR_{MAX}$ is similarly experienced in the case of headwinds of negative magnitude (i.e., tailwinds).

In the same manner in which the maximum Effective Glide Slope Ratio is determined, it is also necessary to determine the minimum achievable Effective Glide Slope Ratio, $EGSR_{MIN}$, in the presence of headwinds or tailwinds. To do this, the minimum achievable still-air Glide Slope Ratio $V_S$ airspeed aerodynamic envelope for the glide vehicle is used.

Figure 7:
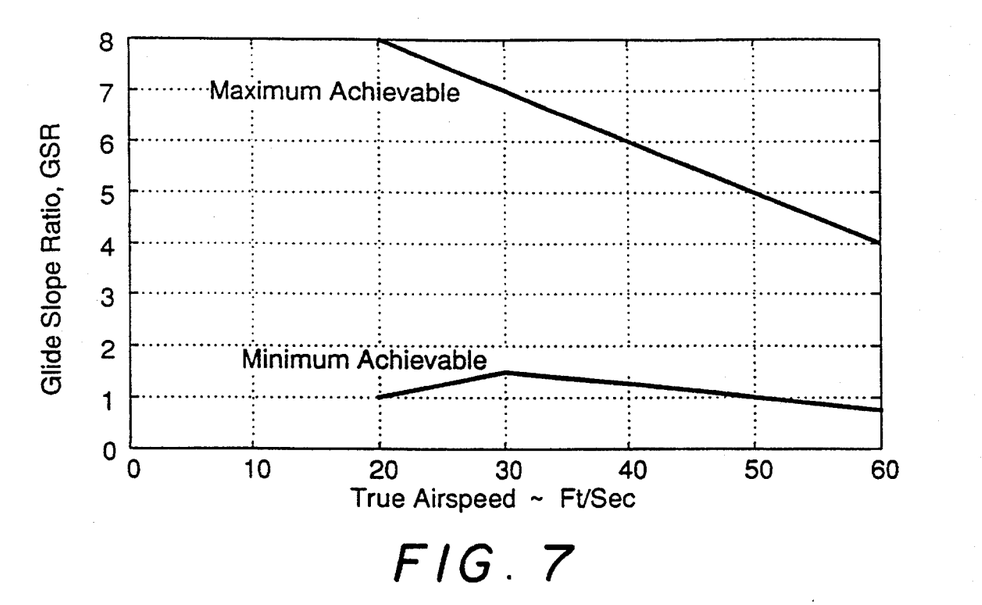
FIG. 7 is a graph showing the relationship between the glide vehicle's maximum achievable, and minimum achievable, still-air glide slope ratios and airspeed.

Adding this minimum still-air envelope to FIG. 3, both extremes of the still-air maneuver capability can now be seen (see FIG. 7).

Figure 8:
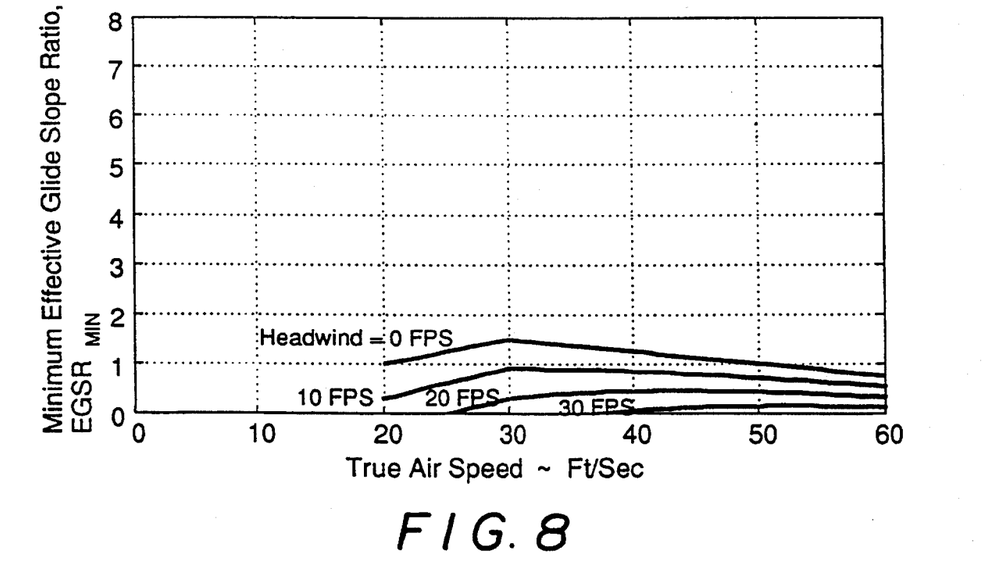
FIG. 8 is a graph showing the relationship between the minimum effective glide slope ratio, airspeed and headwind.

Applying Equation (1) above to the minimum achievable Glide Slope Ratio of FIG. 7 yields a set of minimum Effective Glide Slope Ratio curves, $EGSR_{MIN}$, which are shown in FIG. 8. As with FIG. 6, headwinds of negative magnitude would produce larger, rather than smaller, values of $EGSR_{MIN}$ for a given true airspeed.

Having now characterized a glide vehicle's performance limits in terms of maximum and minimum glide slope ratios achievable under varying conditions of headwind and airspeed, it is necessary to apply these to specific flight geometries relative to the desired destination.

Figure 9:
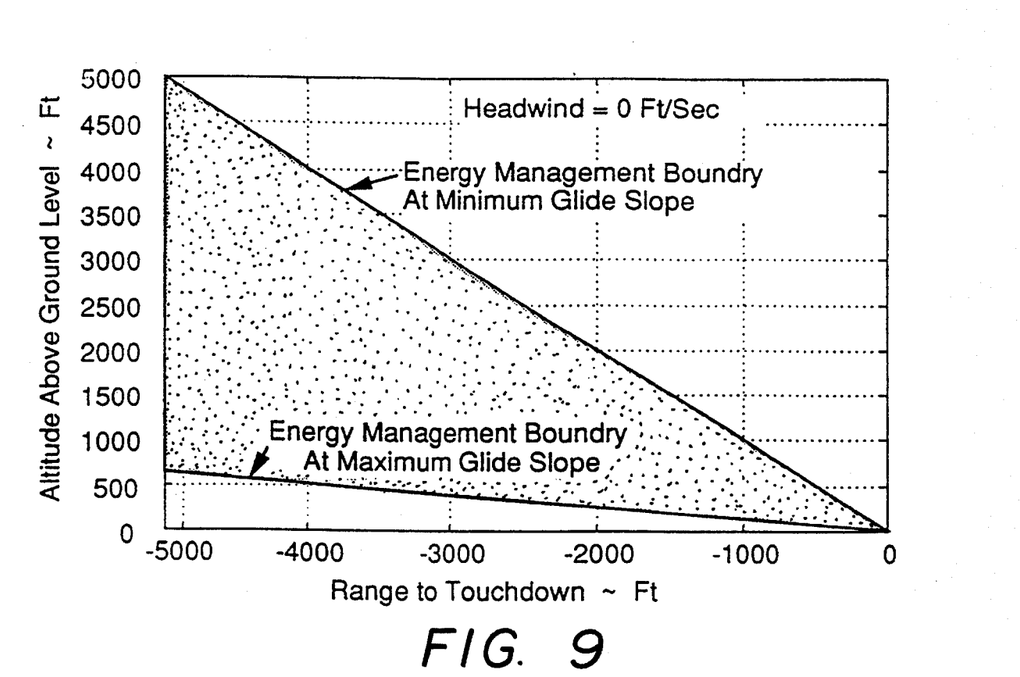
FIG. 9 is a graph showing the energy management boundaries for a glide vehicle at a given wind condition.

FIG. 9 shows the instantaneous spatial performance envelope of a glide vehicle created by a single combination of maximum and minimum effective glide slope ratios, such as might be determined by the previous equations at one particular value of headwind.

For the exemplary glide vehicle discussed in connection with the above Figures, where zero velocity headwinds and zero velocity tailwinds are experienced, it will have the capability of reaching its intended destination within its energy management limitations if it is launched, and stays within, the values defined within the shaded portion of FIG. 9. A headwind or tailwind will have the effect of dynamically increasing or decreasing, respectively, the energy management boundaries (FIG. 9) for each time segment (i.e., each fraction of a unit of time) over the duration of the vehicle's flight.

The present invention therefore provides an energy management system which defines, in real time, a single, unique, optimum flight path characterized by providing the greatest tolerance to uncertainties in the headwind and/or tailwind at all points during a descent.

The energy management system of the present invention includes real-time system software which enables the continuous determination of the single, unique, optimum flight path, based on an optimum EGSR, from launch or other initial airborne location to destination, which offers the maximum positive and negative tolerance to headwinds and tailwinds at each altitude during descent.

As discussed above, the value of $EGSR_{MAX}$ is decreased with increasing headwinds, while the value of $EGSR_{MIN}$ is increased with increasing tailwinds. The optimum EGSR is defined by starting with the $EGSR_{MAX}$ and the $EGSR_{MIN}$ associated with the current headwind or tailwind, and determining what single value of headwind or tailwind deviation (applied in opposite directions) would cause the $EGSR_{MAX}$ and the $EGSR_{MIN}$ to become the same value. The wind deviation value is applied as a headwind in the case of $EGSR_{MAX}$ and as a tailwind in the case of $EGSR_{MIN}$.

The Optimum Effective Glide Slope Ratio is defined when the following equation is satisfied:

$$EGSR_{MAX} (V_{WIND}+\Delta V_{TOLERANCE}) = EGSR_{MIN} (V_{WIND}-\Delta V_{TOLERANCE}), \quad (2)$$

where $EGSR_{MAX} (V_{WIND}+\Delta V_{TOLERANCE})=EGSR_{MAX}$ in the presence of added headwind, and $EGSR_{MIN} (V_{WIND}-\Delta V_{TOLERANCE})=EGSR_{MIN}$ in the presence of added tailwind.

Figure 10:
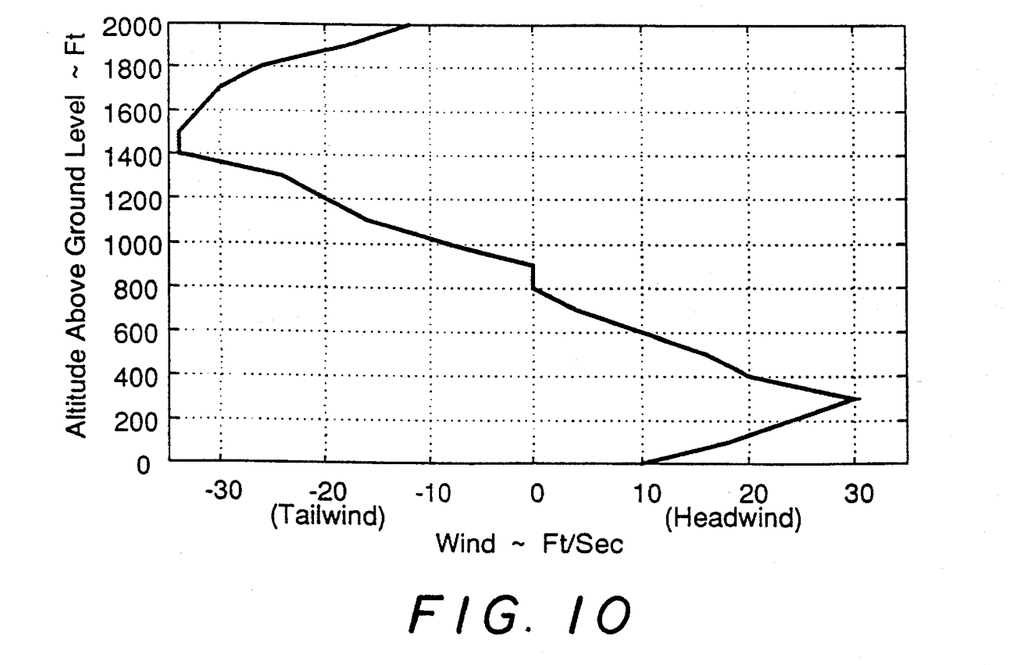
FIG. 10 is a graph showing the relationship between headwinds or tailwinds and altitude for an exemplary case.

The Optimum Flight Path, or OFP, is mathematically defined by starting at the destination point and, with numerical integration techniques, integrating the Optimum Effective Glide Slope Ratio at each altitude in the direction of the launch point. That process is expressed by the following equation:

$$Z_{OPT}(x) = -\int_{0}^{XLAUNCH} \frac{1}{OEGSR} \cdot dx \quad (3)$$

where $ZOPT(x)$=Optimum Altitude of Descent Profile Vs Distance X From Destination, Ft $XLAUNCH$=Cumulative Launch Ground Range From A Destination Located at 0, Computed Along All Flight Legs, Ft $OEGSR$=Optimum Effective Glide Slope Ratio Consider now an example, where the headwinds vary as a function of altitude, as shown in FIG. 10. Applying the techniques for determining effective minimum and maximum glide slope ratios in the presence of winds, as illustrated in FIGS. 4, 6 and 8, and using the equations (2) and (3), the Optimum Flight Path (OFP) can be produced.

Figure 11:
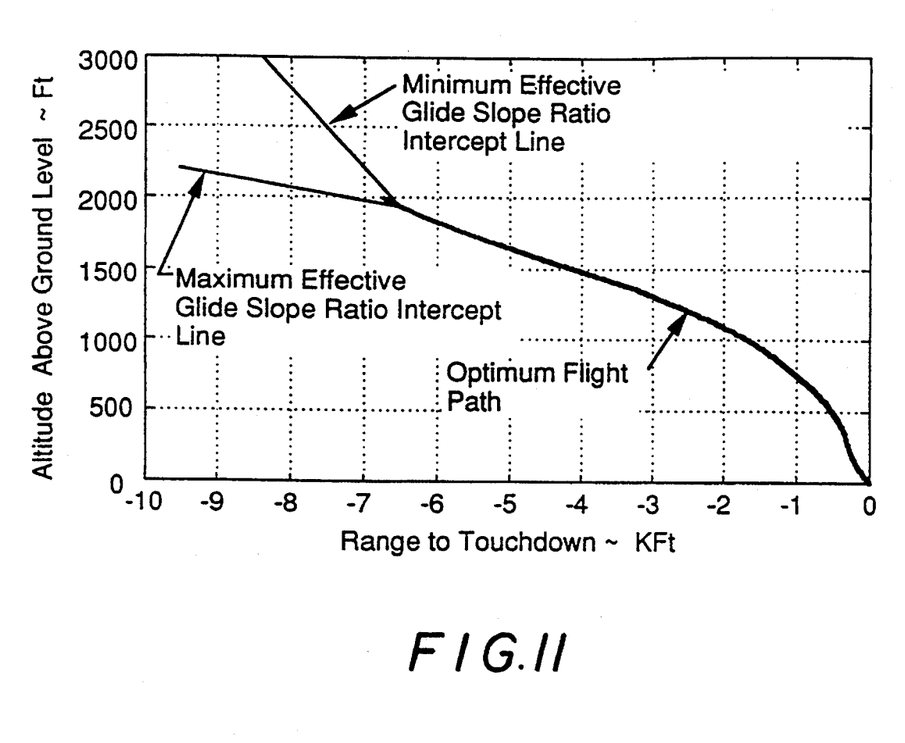
FIG. 11 is a graph showing the optimum flight path to a predetermined destination for the wind profile of FIG. 10.

FIG. 11 illustrates the results of this methodology when applied to the wind profile defined in FIG. 10. Each point along the OFP exhibits the maximum tolerance to headwind and tailwind variations at that particular altitude.

The maximum and minimum Effective Glide Slope Ratio intercept lines shown in FIG. 11 are representative of the glide vehicle's energy maneuverability in approaching the OFP at the altitude where those two intercept lines intersect.

FIG. 11 exhibits the Optimum Flight Path which results from a complex wind profile of the type shown in FIG. 10. The Optimum Flight Path can be determined when an estimate of wind profile as various altitudes is known. For cases where only a constant (or no) wind value is known for all altitudes of the descent path, the OFP becomes a straight line, with intercept boundaries similar to the case shown in FIG. 9.

In summary, the energy management system of the present invention is capable of optimizing the vertical descent flight path of a glide vehicle, while also optimizing the vehicle's tolerance to potentially changing wind conditions during descent to the landing destination.

The present invention contemplates embodying the foregoing mathematical analysis in software for developing, in real time, a control law for the Energy Management System of the present invention. It is further the object of the present invention to functionally couple the Energy Management System with navigation and guidance apparatus which also is embraced by the present invention (described below).

The analysis and equations set out above are thus shown to be capable of continuously defining and redefining, from moment to moment (i.e., real-time), a single, unique optimum flight path which can be utilized by the navigation and guidance apparatus of the present invention to most effectively and efficiently maneuver the glide vehicle from launch to destination.

Figure 12:
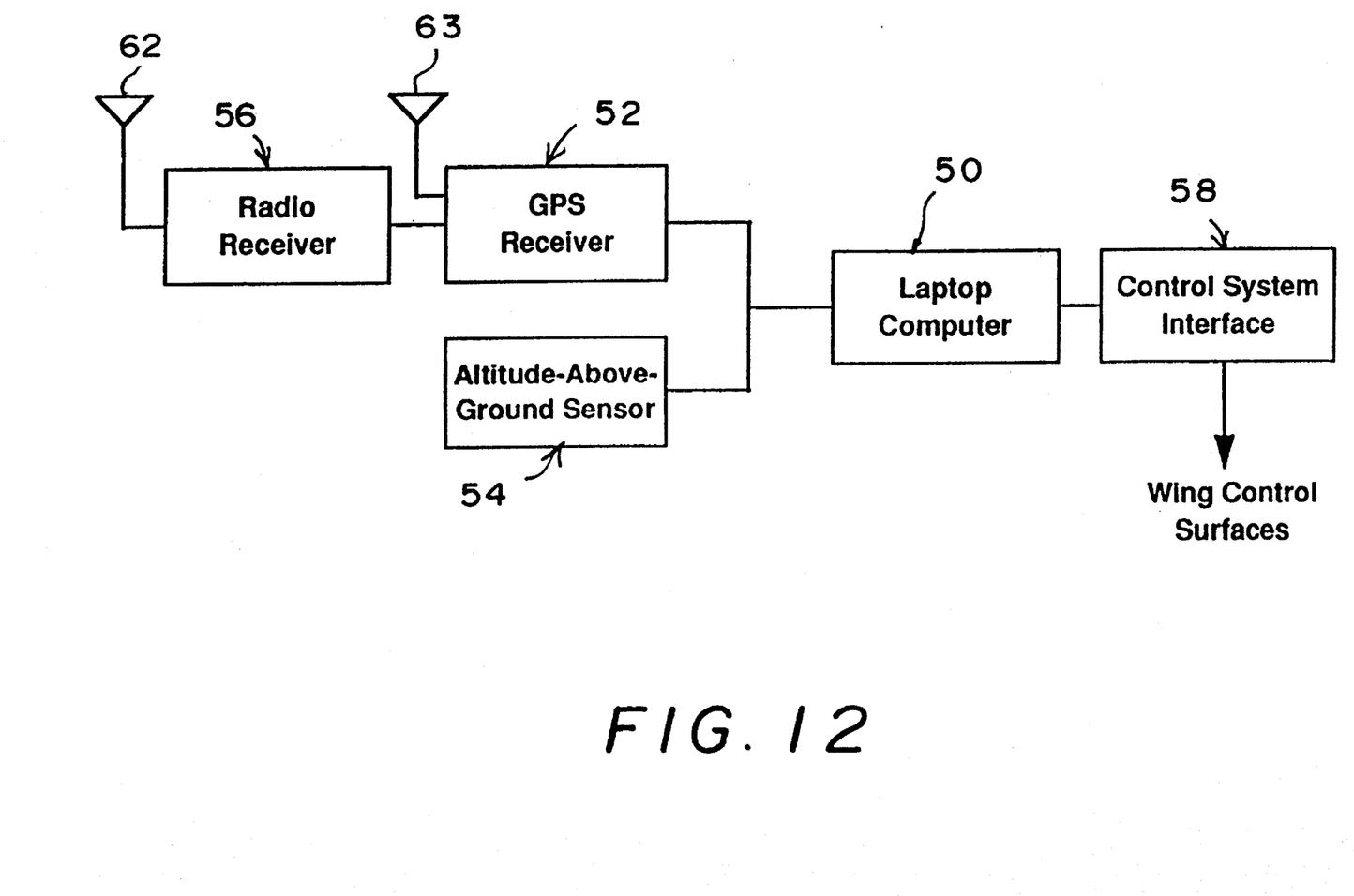
FIG. 12 is a block diagram showing the hardware used in the Energy Management System of the present invention.

Referring now to FIG. 12, there is illustrated the major components of the glide vehicle navigation and guidance system contemplated by the present invention.

First, there is a laptop or other flight computer 50, which hosts navigation and guidance algorithms for transforming navigation data into commands for controlling movements of the glide vehicle control surfaces. The computer is also used for determining an Optimum Flight Path based on available and known minimum and maximum Glide Slope Ratio characteristics of the glide vehicle.

Next, a GPS receiver 52 provides the principal source of navigation input data, including air vehicle position and vehicle velocity, both in three vector components.

An altitude-above-ground sensor 54 provides information necessary for determining the proximity of the airborne vehicle to the ground during approach to, and in, the landing zone to enable the vehicle to attain a soft landing.

A radio receiver 56 or other similar means may be used to pass GPS differential correction data to the GPS receiver 52 to improve horizontal navigation accuracy and eliminate the need for an altitude-above-ground sensor outside a reasonable radius from the landing zone.

The laptop or other flight computer 50 drives a control system interface 58 which in turn sends signals to control devices designed to operationalize various wing control surfaces required to effect the requisite flight maneuvers.

Figure 13:
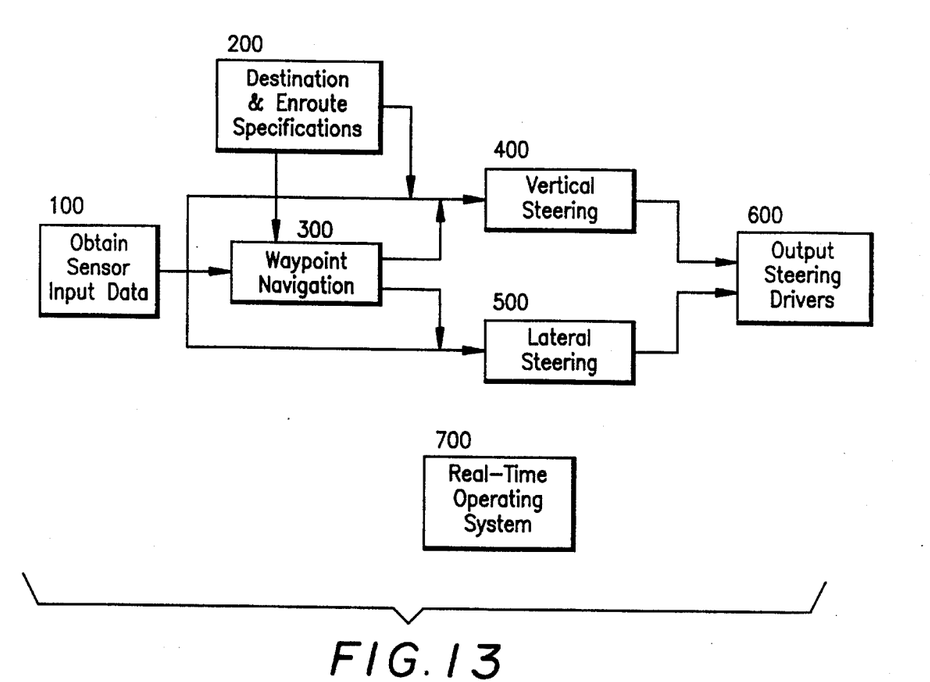
FIG. 13 is a master flow chart of the logic of the Energy Management System of the present invention.

FIG. 13 depicts the master logic flow chart for the navigation and guidance apparatus of the present invention. As shown, at a first functional block 100, sensor data which has been obtained is collected as input data. Block 200 is a library or data base of information which has been created before the launch of the vehicle. This information includes destination and enroute data deemed necessary for accurate operation of the apparatus (exemplary information includes longitude and latitude coordinates, time, velocity). This data is stored and maintained for the purpose of comparison with real-time information detected by the vehicle sensors and the GPS system, and the optimum flight path which is updated on a real-time basis during the flight of the vehicle by OFP calculations (defined above) in the laptop or flight computer. A waypoint navigation block 300 obtains input from blocks 100 and 200, and enables vertical and lateral steering calculations. Vertical steering block 400 and lateral steering block 500 receive input from blocks 200 and 300, and each of the vertical and lateral steering blocks produces signals for enabling operation of the output steering drivers at block 600. The steering output block 600 controls various mechanisms used to manipulate the performance of the vehicle, such as elevators and flaps. A real-time operating system block 700 provides a time-keeping function for the overall guidance control operating system.

Figure 14:
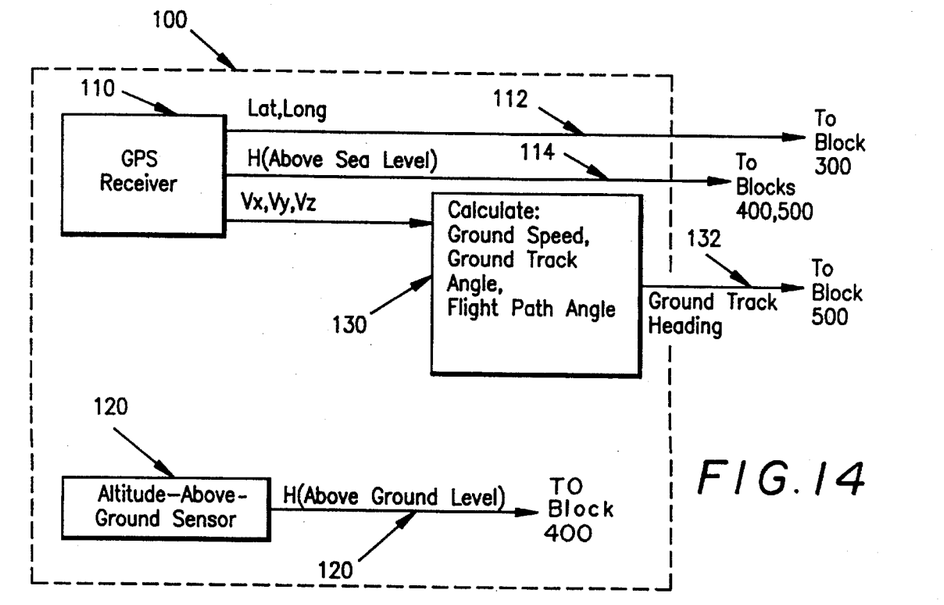
FIG. 14 is a logic flow chart of the Sensor Input Data Block 100 shown in FIG. 13.

FIG. 14 depicts the logic flow chart of the sensor input data block 100. Here, navigation data from two major sources is processed. The position of the vehicle (i.e., longitude and latitude) is provided via line 112 by the GPS receiver 110 to block 300. The three velocity vectors Vx, Vy, Vz are also provided by the GPS receiver 110 to block 130 where the Ground Speed, the Ground Track Angle (the ground heading of the aircraft's velocity vector) and the Flight Path Angle (vertical descent angle) are calculated. The vehicle's altitude above ground level 122 is provided by the Altitude-Above-Ground sensor 120 to block 400.

Figure 15:
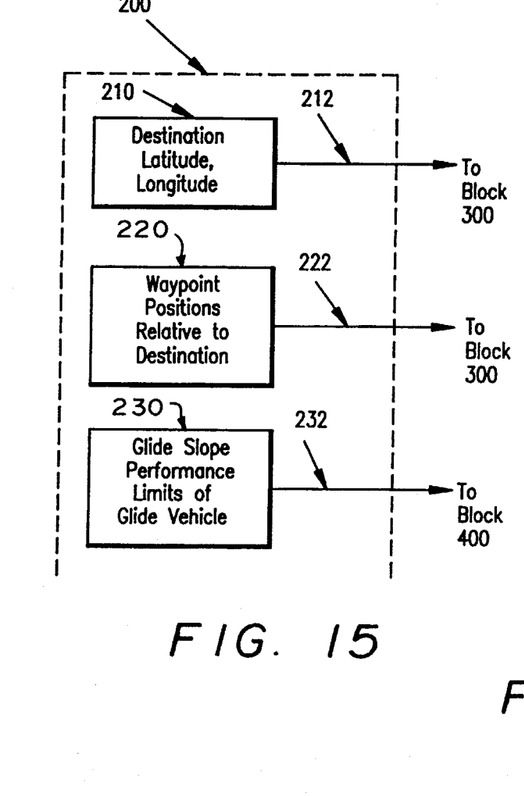
FIG. 15 is a logic flow chart of the Destination and Enroute Input Data Block 200 shown in FIG. 13.

Block 200 specifies the parameters governing the intended flight path. This information is specified during a pre-mission phase and is entered into the glide vehicle system's computer prior to launch. Information regarding destination latitude and longitude (block 210) is sent via line 212 to block 300, information regarding enroute waypoint positions in a coordinate frame relative to the destination (block 220) is sent to block 300 via line 222, and information concerning glide slope angle performance limits of the glide vehicle is passed on to block 400 via line 232.

Figure 16:
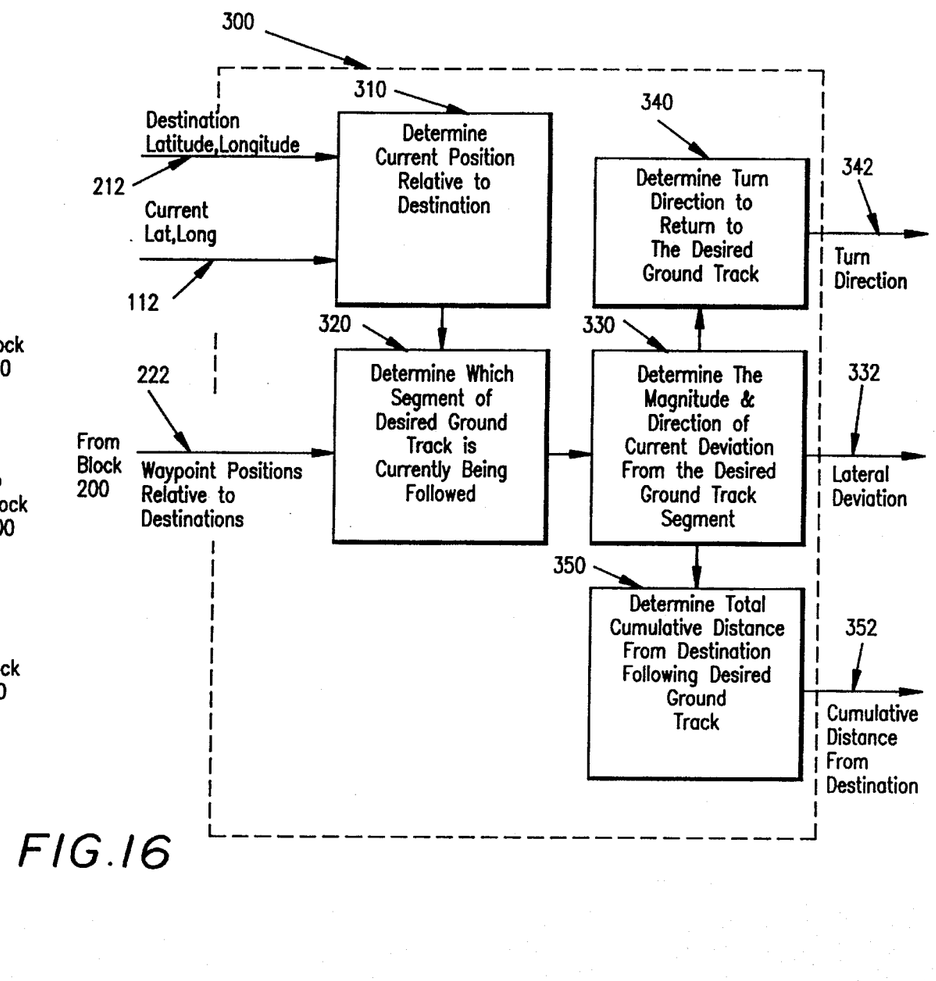
FIG. 16 is a logic flow chart of the Navigation Block shown in FIG. 13.

At block 300, shown in FIG. 16, the glide vehicle current horizontal position is quantified with respect to the desired ground track. The first step in this process occurs at block 310 where the current position of the glide vehicle is translated into a relative coordinate system centered around the destination using current latitude and current longitude position data provided from the GPS via line 112, and destination latitude and longitude coordinates stored in the flight computer provided via line 212. The relative destination information is passed to the next block 320 which determines which segment of the desired ground track in the guidance system should be followed. This is accomplished by the guidance system keeping track of the pair of waypoints consisting of the last-passed waypoint and the next sequential waypoint. An advance to the next sequential ground track leg requires the satisfaction of two criteria:

1. Passing within a predetermined distance of the next scheduled waypoint, and
2. Experiencing increasing range to the next scheduled waypoint, signaling that the current flight path has arrived at its closest approach to that waypoint and is now beginning to move away from it.

Having thus clearly identified the ground track segment to be used as the current reference, the magnitude and direction of the current deviation from that reference ground segment is next determined at the block 330. The magnitude is computed as the current position's perpendicular distance from the reference ground track segment.

Next, the turn direction to return to the desired ground track is determined at block 340. The term "direction" is in reference to the left or right turn direction required to return the glide vehicle to the desired ground track, traveling in the proper direction along the desired ground track. Turn directions are provided to functional block 500 to facilitate lateral steering by the guidance system via line 342.

The last step in this logic sequence is the determination (at block 350) of the total cumulative distance from the destination to be travelled along the sequence of ground track segments enroute to the destination. This information is passed via line 352 to block 400 for subsequent vertical guidance determinations.

Figure 17:
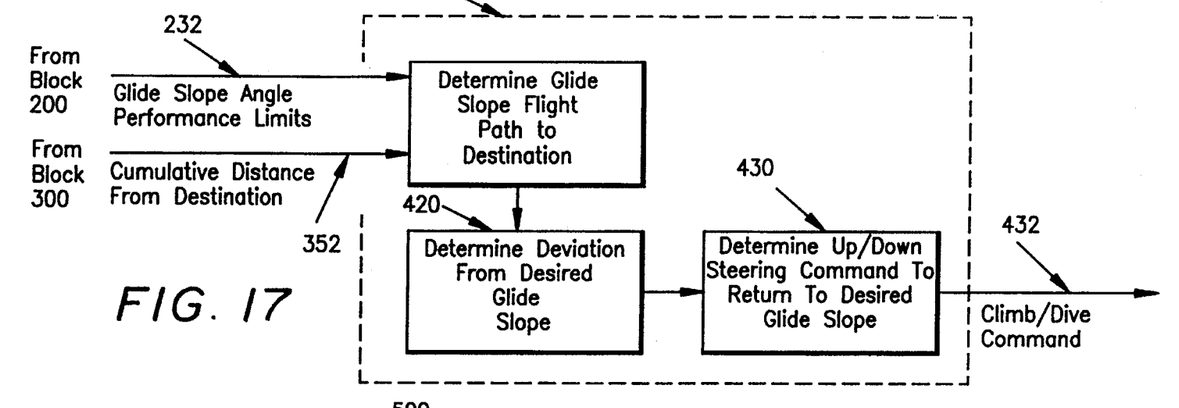
FIG. 17 is a logic flow chart of the Vertical Steering Block 400 shown in FIG. 13.

At block 400, a climb/dive vertical steering command based upon the inherent performance characteristics of the glide vehicle is determined based on the vertical steering to the Optimum Flight Path (OFP) defined above. The first step in this process is to construct the OFP to be followed to the destination based on the current remaining distance to be traveled to the destination obtained via the input of line 352, and the glide slope performance limits pre-stored in the flight computer and provided via input line 232. Next block 420 determines the altitude deviation of the current glide vehicle position from the desired glide slope line. This information is passed on to block 430 where an appropriate climb or dive command is computed to return the glide vehicle to the desired glide slope. This climb or dive command signal is then passed via line 432 to the output command drivers at block 600.

Figure 18:
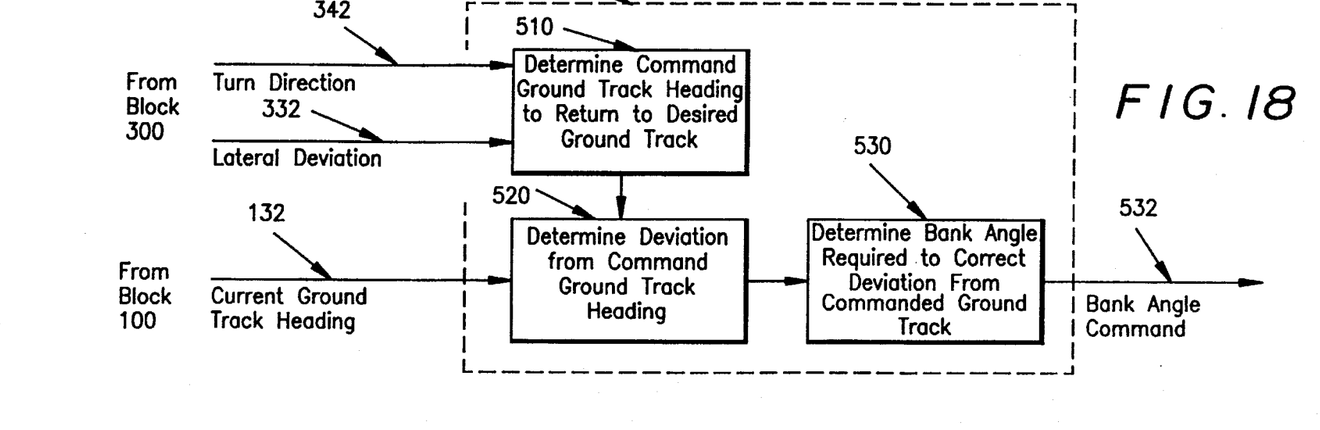
FIG. 18 is a logic flow chart of the Lateral Steering Block 500 shown in FIG. 13.

At the lateral steering block 500 shown in FIG. 18, a suitable bank angle command signal is determined with the objective of causing the glide vehicle to return to the desired ground track. The first step, performed in block 510, is the determination of an optimal command ground track heading to cause the glide vehicle to return to the desired ground track. For this determination, block 510 receives the information computed in block 300 of turn direction provided via line 342 and of lateral deviation provided via line 332. The resultant new command heading is a combination of the prescribed waypoint leg segment heading, modified by an amount proportional to the magnitude of the current lateral deviation. The constant of proportionality is derived empirically based on simulation of the vehicle response characteristics and bank angle limits. Next, block 520 compares the newly-commanded ground track to the current ground track heading provided from block 100 via line 132. The difference is passed to block 530 where an appropriate bank angle is computed for causing the glide vehicle to converge upon the originally proscribed ground track. Again, constants of proportionality, which scale the deviation to bank angle command, are derived empirically based on simulation of the vehicle response characteristics and bank angle limits. The computed bank angle command is provided to the output steering drivers via line 532.

Figure 19:
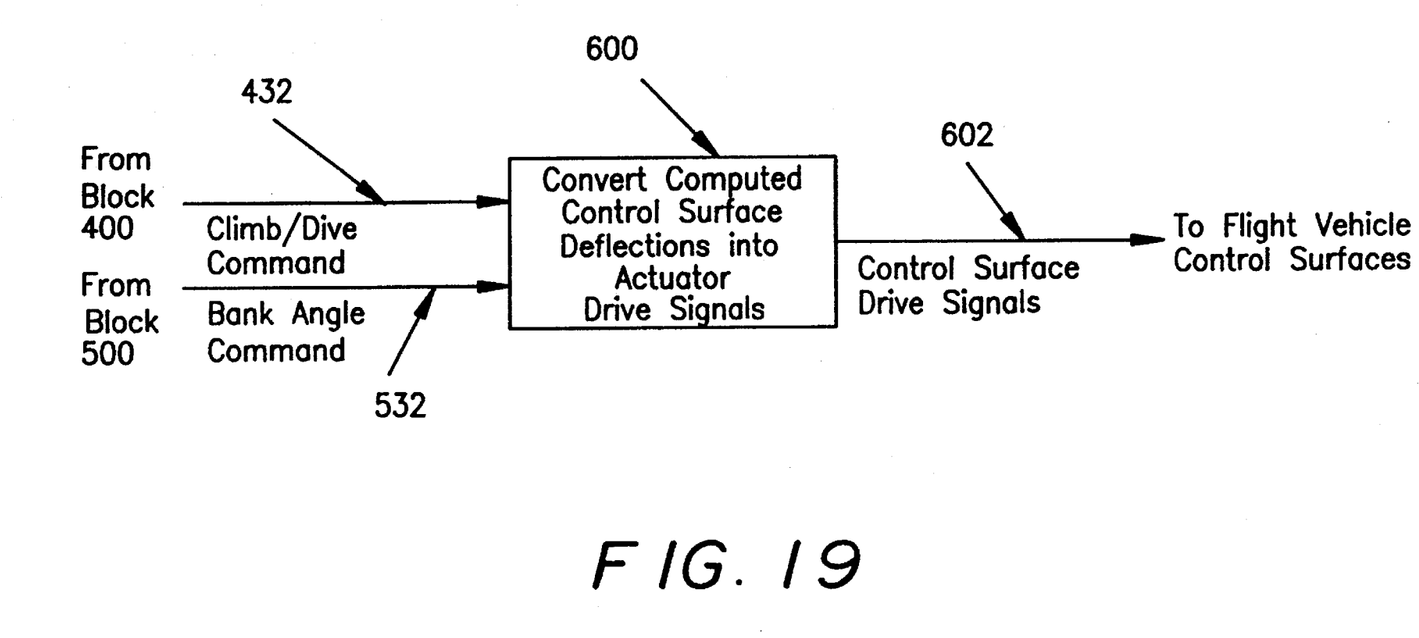
FIG. 19 is a flow chart of the logic of the Output Steering Drivers Block 600 shown in FIG. 13.

The steering output block 600 has the function of converting climb or dive angle steering commands received via line 432 from block 400 and bank angles for lateral steering received via line 532 from block 500, into control surface deflection signals. These signals, represented by line 602, can be of any number equivalent to the number of control actuators which exist on the glide vehicle. Correlation between the signals and the control actuators is accomplished through a series of table-lookup functions. Data utilized in the lookup functions is derived empirically from prior flight test data obtained throughout the operational envelope of the glide vehicle.

The function of the real-time operating system block 700 is to insure that input and output signals are serviced at regular intervals, and well as to cause all the software functions described in the other blocks to be executed at a controlled iteration rate. The execution speed of the computer and the amount of computations which must be performed during a single pass through the total program determine the time required to complete a single iteration. At every iteration, a determination is made of the difference between the simulated time and the actual time received the computer's internal clock. The magnitude of the difference is used as a criteria to determine whether a delay needs to be introduced into the program operation to enable the two time sources to maintain synchronization.

There has thus been described a method and system for energy management applied to unpowered, airborne vehicles to maximize the chances of such vehicles reaching the intended destination from an initial launch altitude, without deviating from a prescribed ground track. The method and apparatus for energy management described and illustrated in this application achieves this objective by guiding the glide vehicle to the glide slope line within the performance limits of the vehicle, which maximizes tolerance to changing wind conditions at all altitudes during the descent.

What is claimed and desired to be secured by Letters Patent of the United States is:

1. A real-time energy management system for a gliding vehicle, comprising:

means for continuously determining an optimum flight path of said vehicle as a function of the vehicle's altitude and position, and means, coupled with said optimum flight path determining means, for continuously controlling flight control surfaces of said gliding vehicle from an initial time to a time of arrival at a predetermined destination, said means for continuously determining an optimum flight path of said vehicle comprising means for determining an effective glide slope ratio and the minimum effective glide slope ratio associated with the current wind profile, and means for determining a single value of wind deviation that will yield equality between maximum and minimum effective glide slope ratios.

2. The apparatus of claim 1, wherein said means for determining said optimum flight path of said vehicle comprises GPS receiver means for providing air vehicle position and velocity vector information, and means for determining the altitude above ground of said gliding vehicle.

3. The apparatus of claim 1, wherein said means for controlling flight control surfaces of said glide vehicle comprises computer means for generating signals to drive the vehicle's control surface actuators.

4. The energy management system of claim 1, wherein said means for continuously determining an optimum flight path of said vehicle includes means for comparing vehicle status indicia corresponding to the current position and altitude of said vehicle with indicia corresponding to the destination position of said vehicle, and means for generating command signals for manipulating vehicle control surfaces when the value determined by said comparing means exceeds a preestablished threshold.

5. A real-time energy management apparatus for an unpowered gliding vehicle, comprising:

means for continuously determining, by defining and redefining, from moment to moment, a single unique and optimum flight path of said vehicle as a function of the vehicle's altitude and position, and means, coupled with said optimum flight path determining means, for continuously controlling flight control surfaces of said gliding vehicle from an initial time to a time of arrival at a predetermined destination.

6. A method for determining at any time t values representing an optimum flight path for a gliding unpowered vehicle moving toward a redefined destination point over a range of sequentially increasing times t, comprising the steps of:

(1) determining, at said time t, altitude and position information associated with said vehicle, and wind profile information as a function of the altitude of said vehicle, (2) determining, at said time t, an effective glide slope ratio of the vehicle as a function of the altitude of the vehicle, (3) determining a value representing the optimum flight path to be followed by said vehicle at said time t by integrating said effective glide slope ratio, at said time t, from the destination point toward the current position and altitude of the vehicle, and (4) continuously updating said time t by an increment $\Delta t$ and repeating steps (1)–(3) for each $t+\Delta t$ until said destination point is reached.

7. The method of claim 6, wherein the step of determining a value representing the optimum flight path to be followed by said vehicle at said time t includes the step of determining an optimum effective glide slope ratio.

8. The method of claim 7, wherein the step of determining the optimum effective glide slope ratio at each time t comprises determining the unique value which satisfies the equation $$EGSR_{MAX} (V_{WIND}+\Delta V_{TOLERANCE})=EGSR_{MIN} (V_{WIND}-\Delta V_{TOLERANCE}), \quad (2)$$

where $EGSR_{MAX}(V_{WIND}+\Delta V_{TOLERANCE}) = EGSR_{MAX}$ in the presence of added headwind, and $EGSR_{MIN}(V_{WIND}-\Delta V_{TOLERANCE}) = EGSR_{MIN}$ in the presence of added tailwind.

9. The method of claim 6, and further including the step of converting said time-dependent values of optimum flight path into a set of control commands for control surface actuators on said vehicle.

10. A method for controlling, at each unit of time in a sequence of time units from the time of an airborne launch to the time of arrival at a predetermined destination, the flight of an unpowered gliding aircraft so that the potential energy of said aircraft can be maximized to facilitate its arriving at said predetermined destination, said method comprising the steps of:

determining, at each unit of time, values representing an instantaneous optimum flight path along a continually changing flight path for said gliding aircraft, and converting, at each unit of time, said values into command signals for control surface actuators on said gliding aircraft, whereby said optimum flight path is predetermined for each new succeeding unit of time to account for variable head and tail winds, cross winds, updrafts and downdrafts, as well as variable terrain and variations in flight path obstacles.

11. The method of claim 10, wherein said step of converting said values into command signals further comprises calculating vertical and lateral steering correction signals and inputing said correction signals to said control surface actuators for altering respective vertical and lateral attitudes of said gliding aircraft.

* * * * *